(No Model.) 2 Sheets—Sheet 1.

E. BOEHME.
FRICTION CLUTCH.

No. 399,733. Patented Mar. 19, 1889.

Witnesses:
James F. DuHamel
Horace A. Dodge

Inventor:
Emil Boehme,
by Dodger Sons,
Attys.

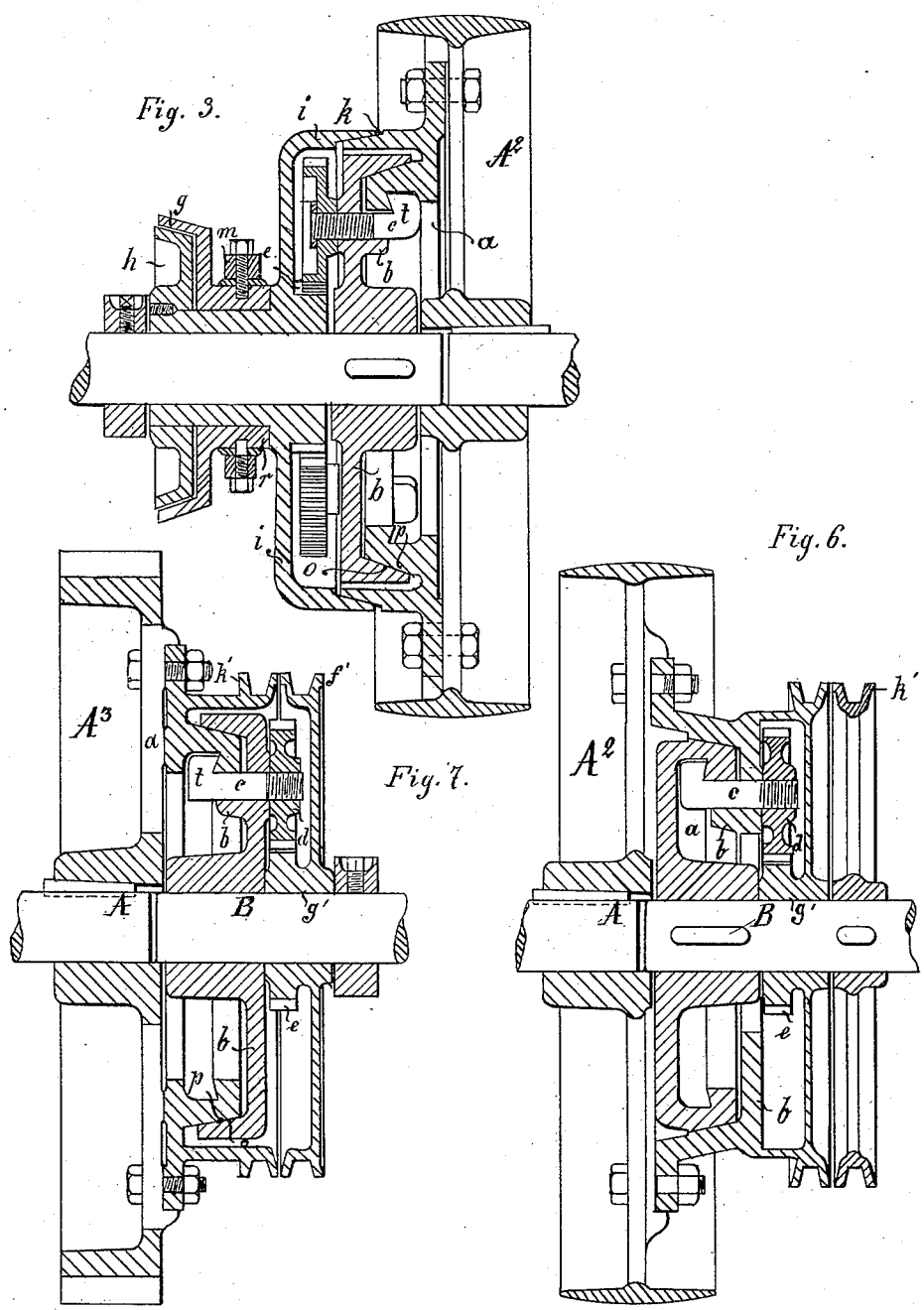

UNITED STATES PATENT OFFICE.

EMIL BOEHME, OF BRESLAU, PRUSSIA, GERMANY, ASSIGNOR TO STANISLAUS LEUTNER & CO., OF SAME PLACE.

FRICTION-CLUTCH.

SPECIFICATION forming part of Letters Patent No. 399,733, dated March 19, 1889.

Application filed August 21, 1888. Serial No. 283,303. (No model.) Patented in Germany November 4, 1887, No. 44,460.

*To all whom it may concern:*

Be it known that I, EMIL BOEHME, of Breslau, in the Kingdom of Prussia and German Empire, have invented a new and useful Automatic Friction-Coupling, (for which I have received Letters Patent of the Empire of Germany, No. 44,460, dated November 4, 1887,) of which the following is a specification.

My invention relates more particularly to conical friction-clutches, and has for its object the connection or disconnection of the parts while in motion without shock to the different parts of the machine. The construction of the clutch is such that the power used for engaging or disengaging it is furnished by the machine itself, so that a small exertion on the part of the operator is sufficient to effect the coupling and uncoupling.

Figure 2:
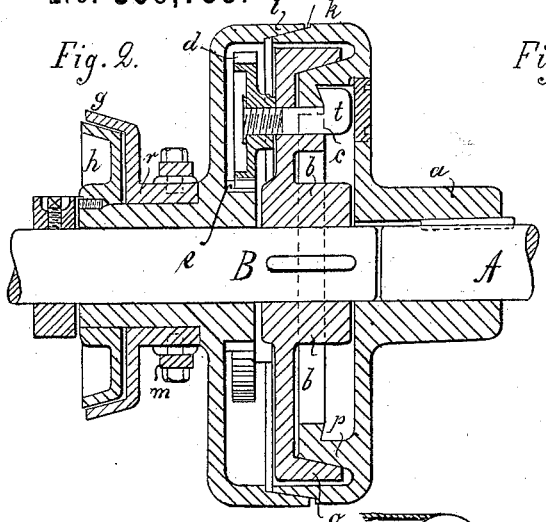
Figure 1:
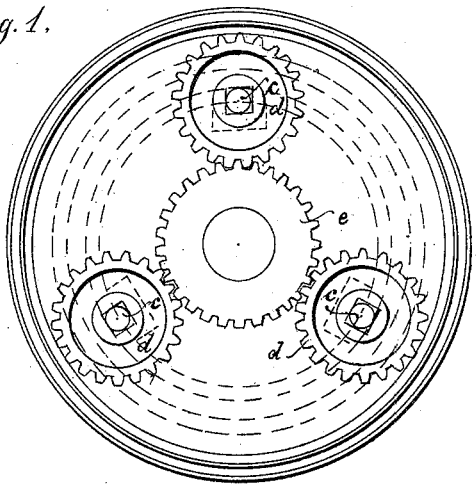

In the arrangements shown in Figures 1, 2, and 3 of the accompanying drawings the engaging and disengaging of the parts of the clutch are effected by means of conical friction-clutches, while in the arrangement shown in Figs. 4, 5, 6, and 7 the engaging and disengaging of the parts of the clutch are effected by means of friction-wheels.

Figure 5:
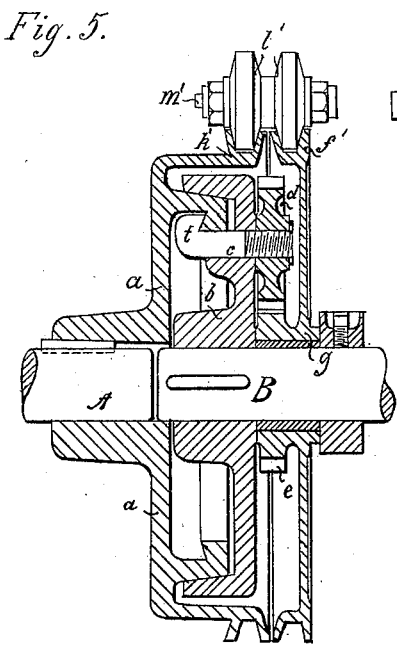
Figure 4:
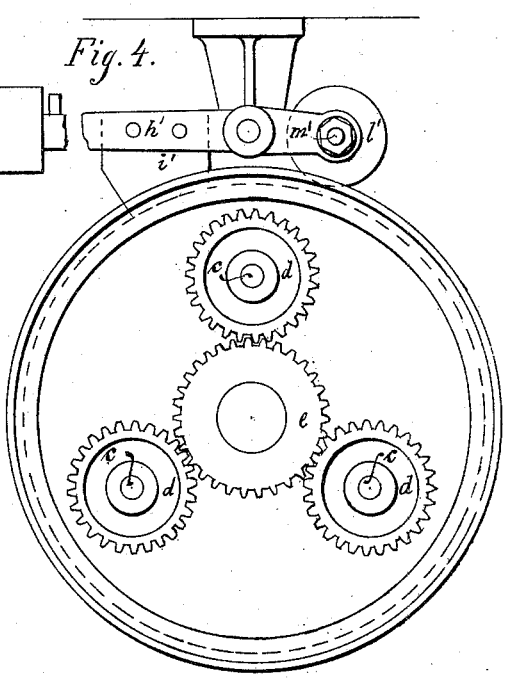

In the drawings, Fig. 1 shows an elevation of one-half of the friction-clutch. Fig. 2 is a longitudinal sectional view; Fig. 3, a slight modification, wherein one part of the clutch is provided with a pulley. Figs. 4 to 7 show a modification of the means for operating the clutch to engage and disengage its parts, Figs. 4 and 5 showing a simple shaft, Fig. 6 a pulley, and Fig. 7 a toothed wheel, as the part from which the power is transmitted.

The part $a$ of the clutch is firmly connected to the driven part of the machine, which may be merely a shaft, A, as represented in Figs. 1 and 2. This shaft may be provided with a band-wheel $A^2$, Figs. 3 and 6, or a gear-wheel, $A^3$, as shown in Fig. 7, or a sprocket-wheel, the manner of imparting motion to the shaft being a matter capable of variation and forming no part of the present invention.

B indicates the shaft to be driven, said shaft carrying the part $b$, with which the part $a$ on the driving-shaft engages.

The engagement and disengagement of the clutch is effected by means of screws $c$, which are preferably mounted in the part $b$, the inclined heads $t$ of the screws engaging with a flange on the part $a$, and being adapted to slide upon said flange when the parts of the clutch are not connected. The screws are turned to connect the parts by means of pinions $d$, mounted upon the threaded ends of the screws $c$, and said pinions are actuated by means of a toothed wheel or pinion, $e$, mounted loosely upon the driven shaft B. The pinion $e$ may be held by the operator by means of a brake or equivalent device while the screws $c$ and pinions $d$ rotate; or, if the part $b$ be stationary, the wheel $e$ may be turned by the operator so as to effect an engagement of the parts $a$ and $b$, the power being furnished by the rotating parts.

The clutch may be disengaged in various ways—for example, by the construction shown in Figs. 2 and 3, in which the conical face $g$ of a sliding cup, $r$, mounted freely upon shaft B, is thrown into engagement with a corresponding conical wheel, $h$, fast upon a casing, $i$, to which is fixed the gear-wheel $e$. By operating the lever $m$, so as to force the face $g$ against the wheel $h$, the toothed wheel $e$ and the part to which it is fixed are held in position, while the remaining parts continue to operate. This operation causes the rotation of the pinions, the loosening of the screws, and the disconnection of the parts $a$ $b$. In order to cause the connection of the parts, the casing $i$ is forced against the rim $k$ of the disk $a$, thereby causing the part $i$ and the gear-wheel $e$ to rotate and the pinions $d$ to tighten up the screws $c$ and connect the parts $a$ and $b$.

Figs. 4 to 7 show a slight modification of this arrangement for connecting and disconnecting the parts.

Referring now to the figures, a friction-wheel, $f'$, provided with a peripheral groove, is secured to or formed integral with the gear-wheel $e$, which is attached to the bushing $g'$, mounted loosely upon shaft A, said wheel $f'$ being held in place by a brake-block, $i'$, carried by the lever $h'$, as shown in Fig. 4. If now the friction-wheel $f'$ and the toothed wheel $e$ be prevented from rotating and the rest of the apparatus permitted to rotate, the pinions $d$ will turn or rotate, the screws $c$ loosened, and the parts $a$ $b$ disconnected, the part $b$ and shaft D eventually coming to rest. A second wheel, $k'$, of the same diameter as wheel $f'$, is secured to shaft A, Figs. 5 and 6, or to the wheel $A^2$, Fig. 7, which continues to rotate after the clutch has been disconnected.

The wheels $f'$ and $k'$ are adapted to be connected by means of a double friction-wheel, $l'$, secured by bolt $m'$ to the lever $h'$, said friction-wheel being so formed that when it is in engagement with the wheels $f'$ and $k'$ it throws them into engagement with each other; but when not in engagement with said wheels it permits them to separate. When the wheels $f'$ $k'$ are thus brought into engagement, the wheel $e$ is rotated and the screws $c$ caused to connect the parts $a$ $b$; but when said wheels $f'$ $k'$ are separated the parts $a$ $b$ will be disconnected.

It will be observed that these several forms of clutch all embody the essential feature of my invention, which consists in causing the engagement and disengagement to be effected by power instead of manually, the only manual operation necessary being that of setting the power devices into operation.

What I claim, and desire to secure by Letters Patent of the United States, is—

1. A friction-clutch consisting of two parts, one carried by the driving-shaft and the other by the shaft to be driven, and L-shaped screws connecting said parts and serving to draw them together.

2. In a friction-clutch, the combination of two parts, one a driver and the other to be driven, screws extending from one of said parts and adapted to engage the other, nuts applied to said screws, and a wheel connected with the driving-shaft and serving to rotate the nuts, whereby the screws are caused to draw the parts together or to release them, as required.

3. In a friction-clutch, the combination of a main clutch consisting of a driver and a driven part, screws extending from one of said parts to the other, toothed nuts applied to said screws, a toothed wheel meshing with said toothed nuts, and a secondary friction-driver carried by the driving-shaft, and serving to rotate the toothed wheel and through it the nuts.

4. In a friction-clutch, the combination of a driver, a driven part adapted to be locked thereto, screws extending from one of said parts to the other, toothed nuts applied to said screws, a toothed wheel meshing with said toothed nuts, and a brake arranged to act upon the toothed wheel and to hold it against rotation while the toothed nuts rotate about it.

5. In a friction-clutch, the combination of a driver and a driven part, screws extending from one of said parts to the other, nuts applied to said screws, a wheel engaging with and serving to rotate said nuts, a secondary clutch or connection serving to connect said wheel with the driver, and a brake arranged to act upon said wheel and prevent its rotation with the driver when not coupled thereto by the secondary clutch.

6. In a friction-clutch, the combination, with a driving-shaft, A, and a driven shaft, B, of two parts, as $a$ and $b$, secured, respectively, to the shafts A B, and one of said parts having an undercut flange, screws $c$, carried by one of said parts and having undercut heads to engage the flange on the other part to draw the parts together, and means for actuating the screws.

7. In a friction-clutch, the combination, with a driving-shaft carrying one part of the clutch, of a shaft to be driven carrying the other part of the clutch, and screws carried by one of said parts and adapted to directly engage the other part to connect the said parts.

In witness whereof I hereunto set my hand in presence of two witnesses.

EMIL BOEHME.

Witnesses:
ERWIN PAULSER,
EDUARD RHINERT.